Aug. 11, 1936.                J. W. WHITE                    2,050,683
                       BRAKE ACTUATING MECHANISM
                         Filed Nov. 27, 1934
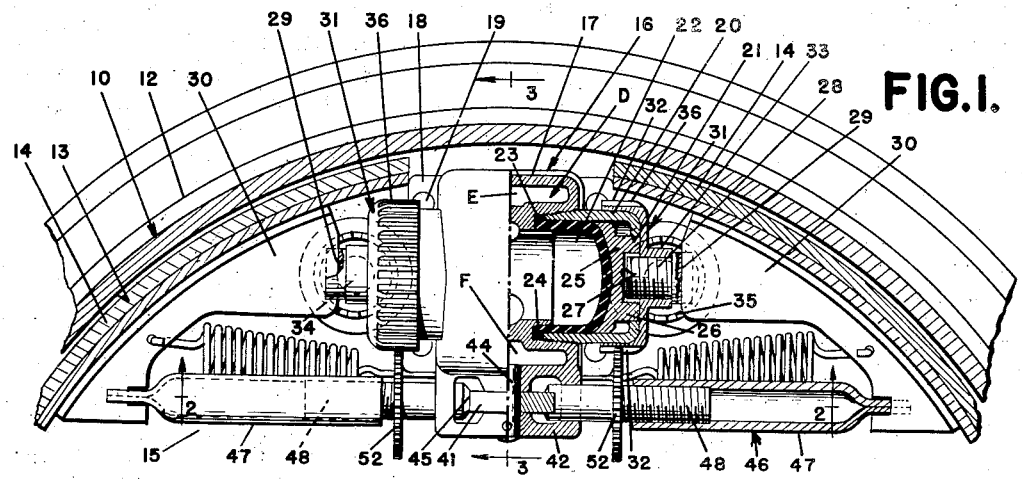
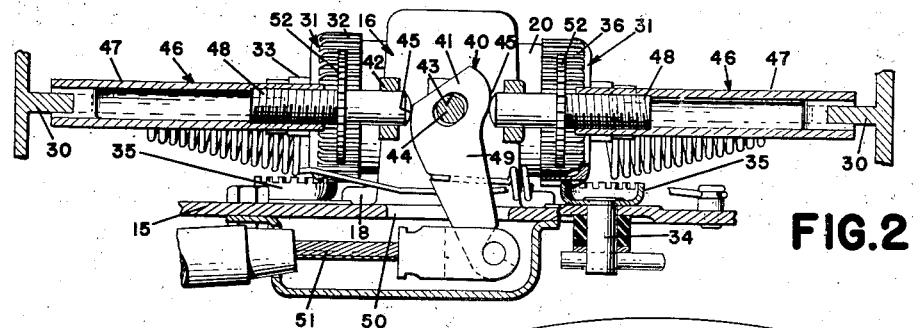
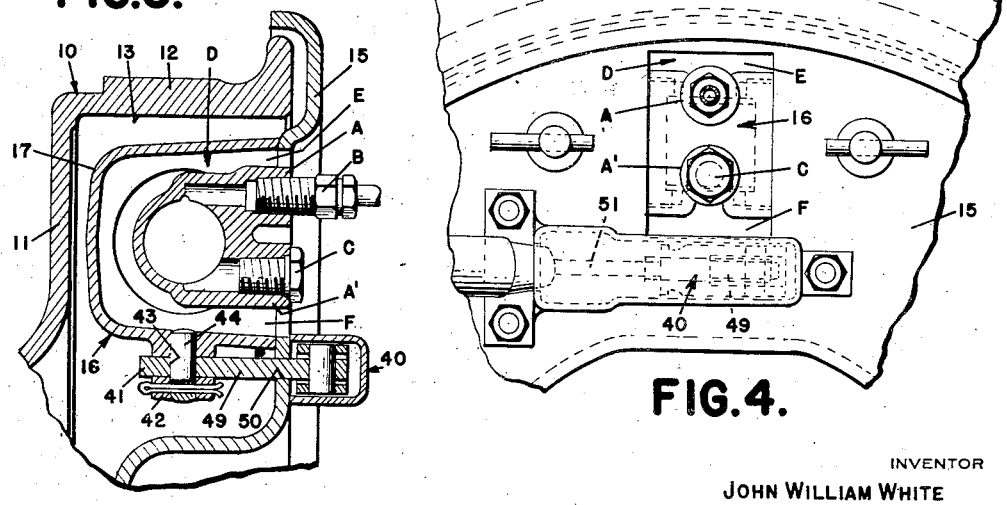
INVENTOR
JOHN WILLIAM WHITE
BY
ATTORNEYS Patented Aug. 11, 1936

2,050,683

UNITED STATES PATENT OFFICE 2,050,683

BRAKE ACTUATING MECHANISM

John William White, Detroit, Mich., assignor, by mesne assignments, to General Motors Corporation, a corporation of Delaware Application November 27, 1934, Serial No. 755,045

17 Claims. (Cl. 188—106)

This invention relates generally to brake mechanisms and refers more particularly to brakes of the type having both hydraulic and mechanical actuators for the brake friction means.

It has been proposed in the past to provide a brake construction with brake friction means having separable ends and having both hydraulic and mechanical actuators operatively connected to the ends for separating the latter to move the friction means into engagement with a braking surface. Provision has also been made for adjusting the hydraulic and mechanical actuators to vary the clearance between the friction means and braking surface, but these adjustments have been complicated in the past, due to the fact that prior constructions necessitated separately adjusting the actuators. The present invention contemplates simplifying adjustment of the actuators and insuring uniform adjustment thereof, by providing a construction wherein operation of the adjusting means associated with one of the actuators automatically effects a corresponding operation of the adjusting means for the other actuator.

Another object of this invention resides in the provision of a brake construction having common means accessible from a point exteriorly of the brake drum for effecting adjustment of both the hydraulic and mechanical actuators.

Still another object of this invention consists in the provision of a brake construction of the type previously set forth, wherein the opposite ends of the actuators connected to the free ends of the friction means are capable of independent adjustment, and wherein adjustment of the actuators connected to the same end of the friction means is effected as a unit by a common operator.

A further advantageous feature of this invention resides in the provision of brake mechanism having a hydraulic actuator, and a mechanical actuator carried by and forming a unit with the hydraulic actuator.

A still further object of this invention consists in the provision of a brake mechanism wherein the mechanical actuator is mounted upon the cooling jacket surrounding the fluid cylinder of the hydraulic actuator.

The foregoing, as well as other objects, will be more fully hereinafter set forth, especially when considered in connection with the accompanying drawing, wherein Figure 1 is a sectional elevational view showing my improved brake mechanism;

Figure 2 is a section partly in elevation taken substantially on the line 2—2 of Figure 1;

Figure 3 is a cross section taken on the line 3—3 of Figure 1;

Figure 4 is a rear elevational view of the backing plate, illustrating the adjusting devices and the ventilating means.

Referring now more in detail to the drawing, it will be noted that there is illustrated in Figure 3, a revoluble brake drum 10 having a web 11 and having an annular brake flange 12 presenting a braking surface 13 for engagement with the friction means 14 mounted upon a stationary backing plate 15 within the drum. The friction means is provided with spaced end portions and may be in the form of a continuous brake band, or may consist in a pair of pivotally mounted shoes.

Irrespective of the particular type of friction means employed within the drum, provision is made herein for hydraulically and mechanically actuating the friction means to expand the same into frictional engagement with the braking surface 13. Both actuators are carried by the backing plate 15 within the drum and are disposed between the free end portions of the friction means 14.

The hydraulic actuator is designated herein by the reference character 16 and comprises a hollow annulus 17 having ears 18 on opposite sides thereof for attaching the same to the backing plate by suitable bolts 19. The reference numeral 20 designates cup-shaped cylinder members having a threaded engagement with opposite ends of the annulus 17 and having openings 21 through the closed ends thereof. Located within the cylinders are the flexible cups 22, preferably formed of rubber, having outwardly extending flange portions 13 which are clamped between the ends of the cylinders 20 and annular shoulders 24 on the annulus 17. Located within the cylinders at the outer sides of the flexible cups 22 are pistons 25 having the inner surfaces concaved for receiving the oblate spheroidal ends of the flexible cups 22 and conforming to the shape of the latter. At the outer ends the pistons 25 are provided with stem portions 26 of sufficient diameter to slidably engage within the openings 21 in the closed ends of the cylinders 20. As shown in Figure 1, the stems 26 are recessed as at 27 to freely receive the inner ends of suitable threaded studs 28. The outer ends of the studs 28 are bifurcated as at 29 to embrace abutment flanges 30 extending inwardly from and secured to the friction means.

With the hydraulic actuator thus far described, it will be understood that if fluid under pressure is introduced into the space within the annulus 17 and cups 22, these cups will be elongated, moving the pistons 25 outwardly and thereby causing a corresponding movement of the studs 28 and brake friction means 14 to apply the brake. The fluid is introduced through a suitable nipple A extending to the rear and through an aperture in the backing plate 15 where it is connected through a coupling B to the conduit leading from a suitable master cylinder (not shown). A second nipple A' normally closed by a plug C forms a means for bleeding the air from the cylinder when the fluid is first introduced therein. As shown particularly in Figure 3, the space D within the hollow annulus 17 communicates with the atmosphere exteriorly of the brake drum through the medium of apertures E and F. Thus when the heat developed by the application of the brake raises the temperature of the air within the brake drum, the hollow annulus 17 forms an insulating means between this heated air and the fluid within the cylinder. Furthermore, any heat passing through the outer wall of the annulus and communicated to the air therewithin, will induce a thermal circulation, expelling the heated air through the aperture E and drawing in cold air through the aperture F. In this way the heat is rapidly dissipated so that the inner wall of the cylinder and the fluid contained therein are kept at a temperature below the vaporizing point of any of the constituents of the braking fluid.

As previously stated, the hydraulic actuator is capable of being adjusted to vary the clearance between the friction means 14 and braking surface 13 of the drum. This adjustment is accomplished herein by varying the effective length of the hydraulic actuator between the free ends of the friction means through the medium of nuts 31 having annular flanges 32 slidably supported upon the outer ends of the cylinders 20 and having outwardly extending hub portions 33 threadedly engaging the studs 28. Inasmuch as the studs 28 are held from rotation by the engagement thereof with the flanges 30 on the friction means, it will be noted that rotation of the nuts in a direction to back the same off the cylinders will increase the effective length of the hydraulic actuator, or in other words, move the friction means into closer proximity to the braking surface of the drum.

In order to permit independent rotation of the adjusting nuts at opposite ends of the hydraulic actuator from points exteriorly of the drum, I provide suitable studs 34 on the backing plate 15 having the outer ends thereof located exteriorly of the drum for manipulation and having crowned gears 35 fixed to the inner ends thereof within the drum for engagement with gear teeth 36 formed on the annular flanges 32 of the nuts 31. With this arrangement, it will be seen that the opposite end portions of the friction means may be independently adjusted to vary the clearance between the friction means and braking surface of the drum.

As indicated above, mechanical means is also provided for actuating the brake friction means, and this mechanical means is designated in the drawing by the reference character 40. In detail, the mechanical actuator comprises a cam 41 horizontally disposed in a housing 42 formed integral with the annulus 17 at the bottom side thereof and having an elliptical opening 43 therethrough for receiving a pin 44 secured in a vertical position within the housing 42. The cam 41 is provided with oppositely disposed cam faces 45 operatively connected to opposite sides of the friction means through the medium of rods 46. The rods 46 comprise tubular elements 47 having the outer ends secured to the flanges 30 on the friction means and having the inner ends threaded for receiving the outer ends of suitable studs 48. The inner ends of the studs 48 are slidably supported within opposite end walls of the housing 42 and terminate adjacent the cam faces 45 for engagement therewith.

The cam 41 is rocked about the pin 44 to expand the friction means into engagement with the braking surface through the rods 46 by means of a lever 49 extending laterally outwardly from the cam through an elongated opening 50 in the backing plate 15. The outer end of the arm 49 is operatively connected to the brake control through the medium of a cable 51.

As stated above, one of the principal features of this invention consists in effecting an adjustment of the mechanical actuator upon adjustment of the hydraulic actuator. This latter feature is accomplished herein by securing a gear 52 on each of the studs 48 in a position to mesh with the gear teeth 36 formed on the adjusting nuts 31. The arrangement is such that when either or both of the crown gears 35 are rotated to adjust the hydraulic actuator, a corresponding adjustment of the mechanical actuator will result, due to the operative connection between the studs 48 and the nuts 31. It may be pointed out in this connection that the mounting for the cam 41 is such as to permit the latter to float between the actuating rods 46, and this is desirable since it permits the cam to automatically position itself during adjustment of the rods 46.

What I claim as my invention is:

1. The combination with a brake drum and brake friction means supported within the drum, of a plurality of separate actuators for the brake friction means, adjustable means associated with each of said actuators to vary the clearance between the friction means and braking surface of the drum, and common means operatively connected to the adjustable means associated with each actuator for simultaneously operating the latter means.

2. The combination with a brake drum, a backing plate and brake friction means mounted on said plate within the drum, of hydraulic and mechanical actuators for the brake friction means, adjustable means associated with each of said actuators to vary the clearance between the friction means and braking surface of the drum, and means operable upon manipulation of the adjustable means associated with one of the actuators to effect a corresponding adjustment of the adjustable means for the other actuator.

3. The combination with a brake drum, a backing plate and brake friction means mounted on said plate within the drum, of hydraulic and mechanical actuators for the brake friction means, adjustable means associated with each of said actuators to vary the clearance between the friction means and braking surface of the drum, and a single control operatively connected to the adjustable means associated with both actuators for simultaneously operating said latter means.

4. The combination with a brake drum, a backing plate and brake friction means mounted on said plate within the drum, of a pair of separate actuators for the brake friction means, adjustable means associated with each of the actuators to vary the clearance between the friction means and braking surface of the drum, and means operatively connecting the adjustable means associated with each actuator whereby operation of one of the latter means effects a corresponding operation of the other.

5. The combination with a brake drum, a backing plate and brake friction means mounted on said plate within the drum, of a hydraulic actuator for the friction means comprising a fluid cylinder mounted on the backing plate and having a jacket for a cooling medium surrounding the cylinder, and a mechanical actuator mounted upon the jacket and operatively connected to the friction means.

6. The combination with a brake drum, a backing plate and brake friction means mounted on said plate within the drum, of a pair of separate actuators for the brake friction means, adjustable means associated with each of the actuators to vary the clearance between the friction means and braking surface of the drum, and a control accessible for manipulation exteriorly of the drum and operatively connected to the adjustable means associated with both actuators.

7. The combination with a brake drum, a backing plate and brake friction means mounted on said plate within the drum, of hydraulic and mechanical actuators for the brake friction means, adjustable means associated with each of said actuators to vary the clearance between the friction means and braking surface of the drum, and a single control accessible for manipulation from a point exteriorly of the drum and operatively connected to the adjustable means associated with both actuators.

8. The combination with a brake drum, a backing plate and brake friction means mounted on said plate within the drum, of a hydraulic actuator for the friction means comprising a fluid cylinder mounted on the backing plate, a piston in said cylinder, connecting means between the piston and brake friction means including a member mounted upon the cylinder for adjustment to vary the clearance between the friction means and braking surface of the drum, a toothed member rotatable from a point exteriorly of the drum and meshing with a series of teeth on said adjustable member for adjusting the latter, a mechanical actuator connected to the friction means through the medium of a threaded element rotatable to adjust the clearance aforesaid between the brake friction means and braking surface, and a gear fixed to the threaded element and meshing with the teeth on the adjustable member aforesaid for actuation with the latter upon manipulation of the toothed member.

9. The combination with a brake drum, a backing plate and brake friction means mounted on said plate within the drum, of a hydraulic actuator connected to the friction means through the medium of a threaded member adjustable to vary the clearance between the friction means and braking surface on the drum, a toothed element meshing with a series of teeth on the threaded member for adjusting the latter, a mechanical actuator also connected to the friction means through the medium of a threaded element adjustable to vary the clearance between the friction means and braking surface aforesaid, and an operative connection between the threaded element and toothed element aforesaid whereby actuation of the latter to adjust the threaded member on the hydraulic actuator effects a corresponding adjustment of the threaded element.

10. The combination with a brake drum, a backing plate and brake friction means mounted on said plate within the drum, of a hydraulic actuator connected to the friction means through the medium of a threaded member adjustable to vary the clearance between the friction means and braking surface on the drum, a toothed element meshing with a series of teeth on the threaded member for adjusting the latter, a mechanical actuator also connected to the friction means through the medium of a threaded element adjustable to vary the clearance between the friction means and braking surface aforesaid, and a gear fixed to the threaded element and meshing with the teeth on the threaded member for actuation by the latter upon manipulation of the toothed element.

11. The combination with a brake drum, a backing plate and brake friction means mounted on said plate within the drum, of a hydraulic actuator having the opposite ends connected to the friction means through the medium of threaded members independently adjustable to vary the clearance between the friction means and braking surface of the drum, a pair of toothed elements respectively meshing with teeth formed on said threaded members for adjusting the latter, a mechanical actuator operatively connected to opposite sides of the friction means through the medium of threaded elements adjustable to vary the clearance between the brake friction means and braking surface aforesaid, and an operative connection between each of said toothed elements and threaded elements for adjusting the latter upon operation of the toothed elements to adjust the threaded members on the hydraulic actuator.

12. The combination with a brake drum, a backing plate and brake friction means mounted on said plate within the drum, of a hydraulic actuator having the opposite ends connected to the friction means through the medium of threaded members independently adjustable to vary the clearance between the friction means and braking surface of the drum, a pair of toothed elements respectively meshing with teeth formed on said threaded members for adjusting the latter, a mechanical actuator operatively connected to opposite sides of the friction means through the medium of threaded elements adjustable to vary the clearance between the brake friction means and braking surface aforesaid, and a gear fixed to each of the threaded elements and meshing with the teeth on the adjacent threaded members.

13. The combination with a brake drum, a backing plate and brake friction means mounted on said plate within the drum, of a hydraulic actuator for the friction means mounted upon the backing plate, a mechanical actuator for the friction means carried by the hydraulic actuator and comprising a cam member rockably mounted on the hydraulic actuator, and means operatively connecting the cam to opposite sides of the friction means including rods slidably supported adjacent the cam in lateral extensions on the hydraulic actuator.

14. The combination with a brake drum, a backing plate and brake friction means mounted on said plate within the drum, of a hydraulic actuator for the friction means comprising an a hollow shell mounted on the backing plate, cylinders secured to and projecting oppositely from said shell, pistons in the cylinders operatively connected to opposite sides of the friction means, a mechanical actuator for the friction means comprising a cam rockably mounted on said shell, means operatively connecting the cam to opposite sides of the friction means including rods having the inner ends slidably supported in extensions on said shell and having the opposite ends connected to the friction means.

15. The combination with a brake drum, a backing plate and brake friction means mounted on said plate within the drum, of a hydraulic actuator for the friction means comprising a cylinder mounted on the backing plate, a piston in the cylinder having a recessed portion extending through an opening in the outer end of the cylinder, a stud having the inner end freely engaging in the recess and having the outer end non-rotatably connected to the friction means, a cup-shaped member mounted upon the outer end of the cylinder and having a hub threaded upon the stud, a toothed element accessible for manipulation exteriorly of the drum and meshing with teeth on the cupped member for rotating the latter on the stud to vary the clearance between the friction means and braking surface of the drum, a mechanical actuator for the friction means comprising a rockable cam carried by the cylinder, means operatively connecting the cam to the friction means including threadedly engaging members, and a gear fixed to one of said members and meshing with the teeth on said cup-shaped member.

16. The combination with a brake drum and brake friction means mounted within the drum, of a hydraulic actuator having the opposite ends operatively connected to the friction means for actuating the latter, a mechanical actuator for the friction means comprising a rockable member supported upon the hydraulic actuator to form a unit therewith, and means other than the operative connection between the hydraulic actuator and friction means for connecting the rockable member to said friction means.

17. The combination with a brake drum and brake friction means mounted within the drum, of an actuator for the friction means having hydraulic actuating means within the drum and operatively connected to the friction means for actuating the same, a housing for said actuating means, a mechanical actuator for the friction means comprising a rockable member mounted upon the housing of the hydraulic actuator exteriorly of the same, and means also supported upon said housing for operatively connecting the rockable member to said friction means.

JOHN WILLIAM WHITE.